United States Patent
Kim et al.

(10) Patent No.: US 9,306,244 B2
(45) Date of Patent: Apr. 5, 2016

(54) BIDIRECTIONAL INTERFACE CIRCUIT AND BATTERY MANAGEMENT SYSTEM INCLUDING THE SAME

(71) Applicant: FAIRCHILD KOREA SEMICONDUCTOR LTD., Bucheon (KR)

(72) Inventors: Jin-Tae Kim, Seoul (KR); Chenghao Jin, Incheon-si (KR); GwanBon Koo, Bucheon-si (KR)

(73) Assignee: Fairchild Korea Semiconductor LTD (KR)

( * ) Notice: Subject to any disclaimer, the term of this patent is extended or adjusted under 35 U.S.C. 154(b) by 329 days.

(21) Appl. No.: 14/074,182

(22) Filed: Nov. 7, 2013

(65) Prior Publication Data

US 2014/0125274 A1   May 8, 2014

(30) Foreign Application Priority Data

Nov. 7, 2012 (KR) .................. 10-2012-0125669

(51) Int. Cl.

| | | |
|---|---|---|
| *G06F 17/50* | (2006.01) | |
| *H01M 10/42* | (2006.01) | |
| *H01M 10/46* | (2006.01) | |
| *H02J 7/00* | (2006.01) | |

(52) U.S. Cl.
CPC .......... *H01M 10/4207* (2013.01); *H01M 10/46* (2013.01); *H02J 7/0021* (2013.01); *H02J 7/0029* (2013.01); *H02J 2007/004* (2013.01); *H02J 2007/0037* (2013.01)

(58) Field of Classification Search
CPC .............................. H02J 7/0031; H02J 7/1423
USPC ........................................................ 320/107
See application file for complete search history.

(56) References Cited

U.S. PATENT DOCUMENTS

| | | | | |
|---|---|---|---|---|
| 6,154,012 | A * | 11/2000 | Drori ............................ | 320/162 |
| 6,501,249 | B1 * | 12/2002 | Drori ............................ | 320/149 |
| 6,522,104 | B1 * | 2/2003 | Drori ............................ | 320/149 |
| 7,039,150 | B1 * | 5/2006 | Drori ............................ | 375/377 |
| 2012/0176826 | A1 * | 7/2012 | Lazar ............................ | 363/126 |
| 2014/0244107 | A1 * | 8/2014 | Delevski et al. ................ | 701/36 |

* cited by examiner

*Primary Examiner* — Suchin Parihar
(74) *Attorney, Agent, or Firm* — Grossman Tucker & Perreault & Pfleger, PLLC

(57) ABSTRACT

A bidirectional interface circuit includes a first current mirror circuit that copies a first reference current to generate a first current sunk from a first output terminal, a second current mirror circuit that copies a second reference current to generate a second current sunk from a second output terminal, an interception switch that is connected between the first output terminal and the second output terminal, a first comparator that outputs an upper state signal based on a comparison result of a voltage of the first output terminal and a first threshold voltage, a third current mirror circuit that copies one of a third reference current and a fourth reference current to supply a third current flowing to a third output terminal, and a second comparator that outputs a lower state signal based on a comparison result of a voltage of the second output terminal and a second threshold voltage.

20 Claims, 4 Drawing Sheets

BIDIRECTIONAL INTERFACE CIRCUIT AND BATTERY MANAGEMENT SYSTEM INCLUDING THE SAME

CROSS-REFERENCE TO RELATED APPLICATION

This application claims priority to and the benefit of Korean Patent Application No. 10-2012-0125669 filed in the Korean Intellectual Property Office on Nov. 7, 2012, the entire contents of which are incorporated herein by reference.

BACKGROUND (a) Field

The present invention relates to a bidirectional interface circuit and a battery management system including the same.

(b) Description of the Related Art

By connecting in series a plurality of battery cells, a battery stack is formed, and power is supplied from the battery stack to a load. The number of a plurality of battery cells is determined according to a load. For example, as a capacity of a load increases, the number of a plurality of battery cells increases.

Because the number of battery cells in which a battery management IC may control is limited, as the number of battery cells that are included in the battery stack increases, the number of battery management ICs increases. Each of a plurality of battery management ICs is connected to a corresponding plurality of battery cells in a battery stack and manages corresponding battery cells. In this case, a plurality of battery management ICs are connected to each other to form a stack structure.

In this case, communication for notifying an abnormal state between adjacent battery management ICs is necessary.

That is, in a plurality of cells that are connected to a battery management IC, when an abnormal state (e.g., over-voltage, low voltage) is sensed, the battery management IC transmits a signal notifying an adjacent another battery management IC of an abnormal state and receives a signal notifying an abnormal state that has occurred in an adjacent another battery management IC.

For example, when a plurality of battery management ICs are connected, the battery management ICs each include two pins for transmitting and receiving a signal to and from an adjacent battery management IC in an upper direction and two pins for transmitting and receiving a signal to and from an adjacent battery management IC in a lower direction. That is, a battery management IC includes four pins for communication with adjacent another battery management IC.

The above information disclosed in this Background section is only for enhancement of understanding of the background and therefore it may contain information that does not form the prior art that is already known in this country to a person of ordinary skill in the art.

SUMMARY

Embodiments provide a bidirectional interface circuit and a battery management system including the same having advantages of reducing the number of communication pins of a battery management IC.

An exemplary embodiment provides a bidirectional interface circuit including: a first current mirror circuit that copies a first reference current to generate a first current that is sunk from a first output terminal; a second current mirror circuit that copies a second reference current to generate a second current that is sunk from a second output terminal; an interception switch that is connected between the first output terminal and the second output terminal; a first comparator that outputs an upper state signal based on a comparison result of a voltage of the first output terminal and a first threshold voltage; a third current mirror circuit that copies one of a third reference current and a fourth reference current to supply a third current flowing to a third output terminal; and a second comparator that outputs a lower state signal based on a comparison result of a voltage of the second output terminal and a second threshold voltage.

The first current mirror circuit may include a current source that supplies the first reference current; a first BJT that has one end that is connected to the ground and the other end and a control terminal that are connected to the current source; and a second BJT that has one end that is connected to the ground and a control terminal that is connected to the control terminal of the first BJT and that is connected to the first output terminal.

The second current mirror circuit may include a current source that supplies the second reference current; a third BJT that has one end that is connected to the ground and the other end and a control terminal that are connected to the current source; and a fourth BJT that has one end that is connected to the ground and a control terminal that is connected to the control terminal of the third BJT and that is connected to the second output terminal.

The third current mirror circuit may include a fifth BJT that has one end and the other end to which a first voltage is supplied and a control terminal that is connected to the other end; a sixth BJT that has one end to which a first voltage is supplied and the other end that is connected to the third output terminal and a control terminal that is connected to the control terminal of the first BJT; a first transistor and a current source that supply a third reference current that is connected in series between the ground and the other end of the fifth BJT; and a second transistor and a current source that supply a fourth reference current that is connected in series between the ground and the other end of the fifth BJT.

Another embodiment provides a battery management system, including: a first battery management circuit that is connected to a plurality of first battery cells; a second battery management circuit that is connected to another plurality of second battery cells adjacent to the plurality of first battery cells; and a first resistor that is connected between a first upper end pin of the first battery management circuit and a second lower end pin of the second current mirror circuit.

The first battery management circuit may include a first current mirror circuit that copies a first reference current to sink a first current from the first upper end pin; a second current mirror circuit that copies a second reference current to sink a second current from the first upper end pin; a first interception switch that is connected between the first upper end pin and the second current mirror circuit; and a first comparator that outputs a comparison result of a first upper end voltage of the first upper end pin and a first threshold voltage.

The second battery management circuit may include a third current mirror circuit that copies one of a third reference current and a fourth reference current to supply a third current to the second lower end pin; and a second comparator that outputs a comparison result of a second threshold voltage and a second lower voltage of the second lower end pin that is generated by the third current and the resistor.

The first current mirror circuit may include a current source that supplies the first reference current; a first BJT that has one end that is connected to the ground and the other end and a control terminal that are connected to the current source; and a second BJT that has one end that is connected to the ground and a control terminal that is connected to the control terminal of the first BJT and that is connected to the first upper end pin.

The second current mirror circuit may include a current source that supplies the second reference current; a third BJT that has one end that is connected to the ground and the other end and a control terminal that are connected to the current source; and a fourth BJT that has one end that is connected to the ground and a control terminal that is connected to the control terminal of the third BJT and that is connected to one end of the first interception switch. The other end of the first interception switch may be connected to the first upper end pin.

The third current mirror circuit may include a fifth BJT that has one end and the other end to which a first voltage is supplied and a control terminal that is connected to the other end; a sixth BJT that has one end to which a first voltage is supplied and the other end that is connected to the second lower end pin and a control terminal that is connected to the control terminal of the first BJT; a first transistor and a current source that supply a third reference current that is connected in series between the ground and the other end of the fifth BJT; and a second transistor and a current source that supply a fourth reference current that is connected in series between the ground and the other end of the fifth BJT.

The second lower end voltage may decrease lower than the second threshold voltage, and the first upper end voltage may become lower than the first threshold voltage by decrease of the second lower end voltage, when the first transistor is changed from a turn-on state to a turn-off state.

The first upper end voltage may increase to the second threshold voltage or more by the third reference current and the resistor, and the second lower end voltage may become the first threshold voltage or more by increase of the first upper end voltage, when the first transistor is changed from a turn-off state to a turn-on state.

The first upper end voltage may decrease lower than the first threshold voltage, and the second lower end voltage may decrease lower than the second threshold voltage by decrease of the first upper end voltage, when the first interception switch is turned on.

The first transistor may be turned off, and the second transistor may be turned on, when the second lower end voltage is lower than the second threshold voltage.

When the second transistor is in a turn-on state, if the first interception switch is turned off, the first upper end voltage may increase to the first threshold voltage or more, and the second lower end voltage may become the second threshold voltage or more by increase of the first upper end voltage.

The first transistor may be turned on, and the second transistor may be turned off, when the first upper end voltage becomes the second threshold voltage or more.

The battery management system may further include a third battery management circuit that is connected to another plurality of third battery cells adjacent to the plurality of first battery cells; and a second resistor that is connected between a first lower end pin of the first battery management circuit and a third upper end pin of the third battery management circuit.

The third battery management circuit may include a fourth current mirror circuit that copies a first reference current to sink a fourth current from the third upper end pin; a fifth current mirror circuit that copies the second reference current to sink a fifth current from the third upper end pin; a second interception switch that is connected between the third upper end pin and the second current mirror circuit; and a third comparator that outputs a comparison result of a third upper end voltage of the third upper end pin and a first threshold voltage.

The first battery management circuit may include a seventh BJT that has one end and the other end to which a second voltage is supplied and a control terminal that is connected to the other end; an eighth BJT that has one end to which a second voltage is supplied and the other end that is connected to the first lower end pin and a control terminal that is connected to the control terminal of the seventh BJT; a third transistor and another current source that supply the third reference current that is connected in series between the ground and the other end of the seventh BJT; and a fourth transistor and another current source that supply the fourth reference current that is connected in series between the ground and the other end of the seventh BJT.

The second lower end voltage may decrease lower than the second threshold voltage, the first upper end voltage may decrease lower than the first threshold voltage by decrease of the second lower end voltage, and the third transistor may be turned off, when the first transistor is changed from a turn-on state to a turn-off state.

The first upper end voltage may increase to the second threshold voltage or more by the third reference current and the resistor, the second lower end voltage may become the first threshold voltage or more by increase of the first upper end voltage, and the third transistor may be turned on, when the first transistor is changed from a turn-off state to a turn-on state.

When the second interception switch is turned on, the third upper end voltage may decrease lower than the first threshold voltage, and the first lower end voltage may decrease lower than the second threshold voltage by decrease of the third upper end voltage, and the first interception switch may be turned on, the third transistor may be turned off, and the fourth transistor may be turned on.

When the second transistor is in a turn-on state, if the second interception switch is turned off, the third upper end voltage may increase to the first threshold voltage or more, and the first lower end voltage may become the second threshold voltage or more by increase of the third upper end voltage, and the third transistor may be turned on, and the fourth transistor may be turned off.

A bidirectional interface circuit and a battery management system including the same that can reduce the number of communication pins of a battery management IC are provided.

DETAILED DESCRIPTION OF THE EMBODIMENTS

Figure 1:
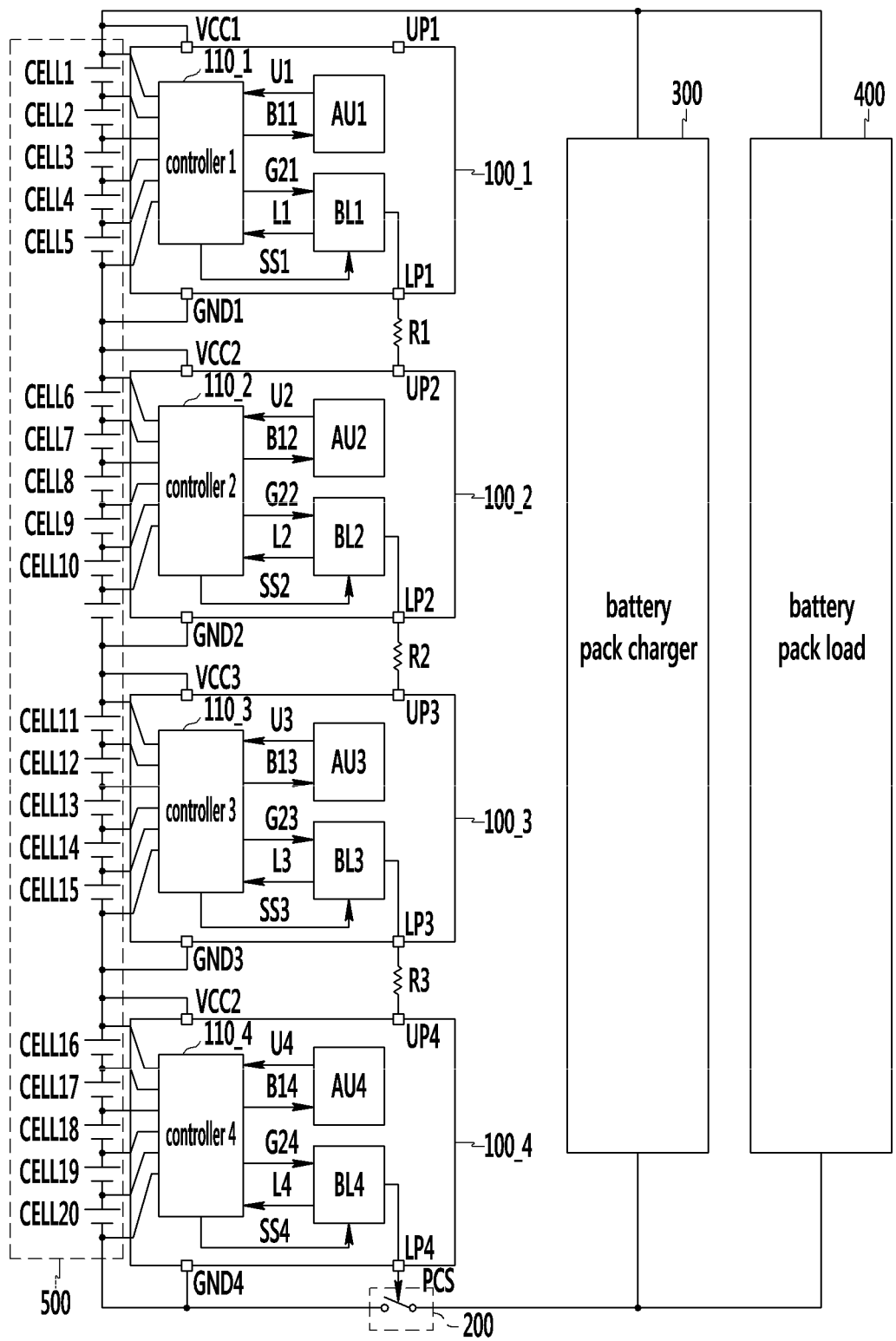
FIG. 1 is a diagram illustrating a battery management system that is formed with a battery management circuit including a bidirectional interface according to an exemplary embodiment.

In the following detailed description, only certain exemplary embodiments have been shown and described, simply by way of illustration. As those skilled in the art would realize, the described embodiments may be modified in various different ways, all without departing from the spirit or scope. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, a bidirectional interface and a battery management system including the same according to an exemplary embodiment will be described with reference to the drawings.

An abnormal state that is described in an exemplary embodiment indicates, for example, a case where a current flowing to a battery pack deviates from a predetermined range, or a case where a cell that deviates from a predetermined voltage range occurs in a plurality of cells that are included in a battery pack. Further, when a battery pack is overcharged or over-discharged, it is also included in an abnormal state. Further, an abnormal state is not limited to an illustration that is described above, and a condition belonging to an abnormal state may be determined according to a design.

FIG. 1 is a diagram illustrating a battery management system that is formed with a battery management circuit including a bidirectional interface according to an exemplary embodiment.

As shown in FIG. 1, the battery management circuit is formed in an integrated circuit, and a battery management circuit according to an exemplary embodiment is connected to a plurality of battery cells.

In FIG. 1, a battery pack 500 in which 20 battery cells are connected in series is managed by four battery management circuits 100_1-100_4. The number (e.g., 20) of a plurality of battery cells constituting the battery pack 500 and the number (e.g., 5) of a plurality of battery cells that are connected to one battery management circuit are an example. An exemplary embodiment is not limited thereto.

A battery pack charger 300 and a battery pack load 400 are connected to both ends of the battery pack 500. The battery pack charger 300 supplies a charge current for charging the battery pack 500. The battery pack load 400 operates by power that is supplied from the battery pack 500.

One end of the battery pack charger 300 and one end of the battery pack load 400 are connected to a positive electrode (+) of the battery pack 500. The other end of the battery pack charger 300 and the other end of the battery pack load 400 connected to each other.

A protection control switch 200 is connected between a negative electrode (−) of the battery pack 500 and the other end of the battery pack charger 300 and the battery pack load 400. When the protection control switch 200 is turned on, the battery pack 500 is charged by a current that is supplied from the battery pack charger 300, or a current is supplied from the battery pack 500 to the battery pack load 400 and thus the battery pack 500 is discharged.

A protection control signal PCS that is transferred from the battery management circuit 100_4 is supplied to a gate electrode of the protection control switch 200, a first terminal of the protection control switch 200 is connected to a negative electrode (−) of the battery pack 500, and a second terminal of the protection control switch 200 is connected to the other end of the battery pack charger 300 and the other end of the battery pack load 400.

In FIG. 1, the battery management circuits 100_1-100_4 each transmit and receive state information thereof through an adjacent battery management circuit and a bidirectional interface. State information is information representing a normal state or an abnormal state.

The battery management circuit 100_1 measures a voltage of each of a plurality of battery cells CELL1-CELL5, and when voltages of the measured plurality of battery cells CELL1-CELL5 are in a predetermined range, it is determined as a normal state.

The battery management circuit 1002 measures a voltage of each of a plurality of battery cells CELL6-CELL10, and when voltages of the measured plurality of battery cells CELL6-CELL10 are in a predetermined range, it is determined as a normal state.

The battery management circuit 100_3 measures a voltage of each of a plurality of battery cells CELL11-CELL15, and when voltages of the measured plurality of battery cells CELL11-CELL15 are in a predetermined range, it is determined as a normal state.

The battery management circuit 100_4 measures a voltage of each of a plurality of battery cells CELL16-CELL20, and when voltages of a measured plurality of battery cells CELL16-CELL20 are in a predetermined range, and the battery management circuit 100_4 measures a current of the battery pack 500, when the measured current is in a predetermined range internal, it is determined as a normal state.

The battery management circuit 100_1 transmits and receives state information to and from the adjacent battery management circuit 100_2. Because the battery management circuit 100_1 is positioned at the top, an adjacent battery management circuit does not exist in an upper direction.

The battery management circuit 100_4 transmits and receives state information to and from the adjacent battery management circuit 100_3. Because the battery management circuit 100_4 is positioned at the bottom, an adjacent battery management circuit does not exist in a low direction.

The battery management circuit 100_4 generates a protection control signal PCS that controls a switching operation of the protection control switch 200 that controls battery charging operation.

The battery management circuit 100_2 transmits and receives state information to and from the adjacent battery management circuit 100_1 and battery management circuit 100_3. The battery management circuit 100_3 transmits and receives state information to and from the adjacent battery management circuit 100_2 and battery management circuit 100_4.

The battery management circuits 100_1-100_4 each include a power supply pin, a ground pin, an upper end pin, and a lower end pin. In order to distinguish the respective same function pins, the battery management circuits 100_1-100_4 each describe together reference numerals and numerals representing a pin.

A power supply voltage necessary for operation of the battery management circuits 100_1-100_4 is supplied to power supply pins VCC1-VCC4. For example, the power supply pins VCC1-VCC4 are connected to a positive electrode of battery cell of a highest potential in a plurality of battery cells that are connected to each of the battery management circuits 100_1-100_4. Power supply pins of each of the battery management circuits 100_1-100_4 are represented with VCC1, VCC2, VCC3 and VCC4.

A reference voltage is supplied to the battery management circuits 100_1-100_4 through ground pins GND1-GND4. For example, the ground pins GND1-GND4 are connected to a negative electrode of a battery cell of a lowest potential in a plurality of battery cells that are connected to each of the battery management circuits 100_1-100_4. Ground pins of each of the battery management circuits 100_1-100_4 are represented with GND1, GND2, GND3, and GND4.

The battery management circuit 100_2-100_4 each transmit state information of a corresponding battery management circuit to lower end pins LP1-LP3 of the adjacent battery management circuits 100_1-100_3 in an upper direction through upper end pins UP2-UP4. The battery management circuits 100_1-100_3 transmit state information of a corresponding battery management circuit to upper end pins UP2-UP4 of the adjacent battery management circuits 100_2-100_4 in a lower direction through lower end pins LP1-LP3.

Because an adjacent battery management circuit does not exist in an upper direction to the battery management circuit 100_1, an upper end pin UP1 of the battery management circuit 100_1 is in a floating state. An adjacent battery management circuit does not exist in a lower direction of the battery management circuit 100_4, but a lower end pin LP4 of the battery management circuit 100_4 is connected to a gate electrode of the protection control switch 200. The protection control signal PCS is supplied to a gate electrode of the protection control switch 200 through the lower end pin LP4.

A resistor exists between an upper end pin and a lower end pin of each of two adjacent battery management circuits. For example, a resistor R1 exists between the lower end pin LP1 of the battery management circuit 100_1 and the upper end pin UP2 of the battery management circuit 100_2, a resistor R2 exists between the lower end pin LP2 of the battery management circuit 100_2 and the upper end pin UP3 of the battery management circuit 100_3, and a resistor R3 exists between the lower end pin LP3 of the battery management circuit 100_3 and the upper end pin UP4 of the battery management circuit 100_4. The battery management circuits 100_1-100_4 each include a controller, an upper communication circuit, and a lower communication circuit.

Controllers 110_1-110_4 determine a state based on a measured result of a voltage of corresponding battery cells. When a cell voltage is a high voltage or low voltage that deviates from a predetermined voltage range, it is in an abnormal state.

Further, the controller 110_4 determines a state based on a measured result of a current flowing to the battery pack 500 together with a voltage measurement result of corresponding battery cells. When a current flowing to the battery pack 500 deviates from a predetermined range, it is in an abnormal state. In an exemplary embodiment, it is described that a function of measuring a battery pack current is included in the battery management circuit 100_4, but the present invention is not limited thereto.

That is, one of the battery management circuits 100_1-100_3 measures a current flowing to the battery pack 500 and determines a battery state based on a measured result.

In this way, state information is determined by the controllers 110_1-110_4.

The controller generates control signals that control an upper communication circuit and a lower communication circuit based on state information of an adjacent battery management circuit that is received through the upper communication circuit or the lower communication circuit and state information of a corresponding battery management circuit.

In order to distinguish the same function configurations of each of the battery management circuits 100_1-100_4, numerals together with reference numerals representing the corresponding configuration are described.

That is, the battery management circuit 100_1 includes a controller 110_1, an upper communication circuit AU1, and a lower communication circuit BL1. An adjacent battery management circuit does not exist in an upper direction of the battery management circuit 100_1, but the battery management circuit 100_1 may include an upper communication circuit AU1. However, an exemplary embodiment is not limited thereto and may not include the upper communication circuit AU1.

The battery management circuit 100_2 includes a controller 110_2, an upper communication circuit AU2, and a lower communication circuit BL2. The battery management circuit 100_3 includes a controller 110_3, an upper communication circuit AU3, and a lower communication circuit BL3.

The battery management circuit 100_4 includes a controller 110_4, an upper communication circuit AU4, and a lower communication circuit BL4. An adjacent battery management circuit does not exist in a lower direction of the battery management circuit 100_4, but the battery management circuit 100_4 may include a lower communication circuit BL4. However, an exemplary embodiment is not limited thereto and may not include a lower communication circuit BL4.

In the battery management circuit 100_1, the controller 110_1 receives an input of an upper state signal U1 from the upper communication circuit AU1, receives an input of a lower state signal L1 from the lower communication circuit BL1, supplies an upper end control signal G11 to the upper communication circuit AU1, and supplies a lower end control signal G21 and a sensing signal SS1 to the lower communication circuit BL1. Because an adjacent battery management circuit does not exist in an upper direction of the battery management circuit 100_1, the upper state signal U1 may be a signal representing always a normal state.

In the battery management circuit 100_2, the controller 110_2 receives an input of an upper state signal U2 from the upper communication circuit AU2, receives an input of a lower state signal L2 from the lower communication circuit BL1, supplies an upper end control signal G12 to the upper communication circuit AU2, and supplies a lower end control signal G22 and a sensing signal SS2 to the lower communication circuit BL2.

In the battery management circuit 100_3, the controller 110_3 receives an input of an upper state signal U3 from the upper communication circuit AU3, receives an input of a lower state signal L3 from the lower communication circuit BL3, supplies an upper end control signal G13 to the upper communication circuit AU3, and supplies a lower end control signal G23 and a sensing signal SS3 to the lower communication circuit BL1.

In the battery management circuit 100_4, the controller 110_4 receives an input of an upper state signal U4 from the upper communication circuit AU4, receives an input of the lower state signal L4 from the lower communication circuit BL4, supplies an upper end control signal G14 to the upper communication circuit AU4, and supplies a lower end control signal G24 and a sensing signal SS4 to the lower communication circuit BL4. Because an adjacent battery management circuit does not exist in a low direction of the battery management circuit 100_4, the lower state signal L4 may be a signal representing always a normal state.

Hereinafter, an upper communication circuit and a lower communication circuit according to an exemplary embodiment will be described with reference to FIG. 2.

Figure 2:
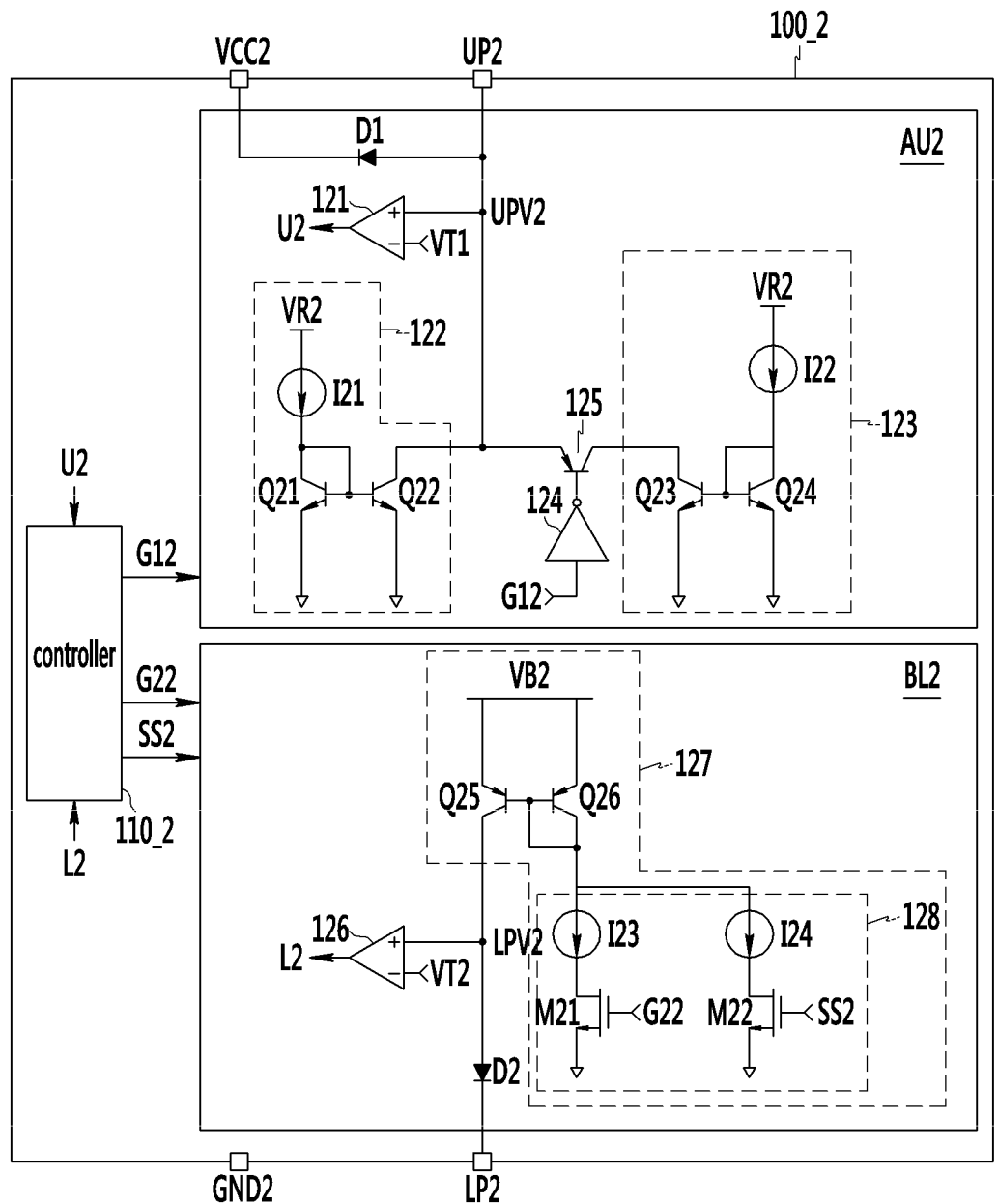
FIG. 2 is a diagram illustrating one of battery management circuits according to an exemplary embodiment.

FIG. 2 is a diagram illustrating one of battery management circuits according to an exemplary embodiment. As shown in FIG. 2, the battery management circuit 100_2 includes a controller 110_2, an upper communication circuit AU2, and a lower communication circuit BL2.

The upper communication circuits AU1, AU3, and AU4, that are not shown in FIG. 2 may be formed in the same structure as that of the upper communication circuit AU2 that is shown in FIG. 2, and lower communication circuits BL1, BL3, and BL4 that are not shown in FIG. 2 may be formed in the same structure as that of the lower communication circuit BL2 that is shown in FIG. 2.

The upper communication circuit AU2 includes a comparator 121, current mirror circuits 122 and 123, an inverter 124, and an interception switch 125.

The comparator 121 generates upper state signal U2 based on a comparison result of a voltage according to state information that is transferred through the upper end pin UP2 and a threshold voltage VT1. A voltage according to state information that is transferred through the upper end pin UP2 is a non-inversion terminal (+) voltage of the comparator 121 and is referred to as an upper end voltage UPV2.

A threshold voltage VT1 is input to an inversion terminal (−) of the comparator 121. When an input of a non-inversion terminal (+) of the comparator 121 is equal to or larger than that of an inversion terminal (−), an output of the comparator 121 is in a high level, and when an input of a non-inversion terminal (+) of the comparator 121 is less than that of an inversion terminal (−), an output of the comparator 121 is in a low level. An output of the comparator 121 is an upper state signal U2. For example, when state information of the battery management circuit 100_1 is abnormal, the upper state signal U2 is in a low level.

The current mirror circuit 122 copies a first reference current and generates a sink current. For example, when a copy ratio of the current mirror circuit 122 is set to one-to-one, the first reference current and the sink current are the same. However, an exemplary embodiment is not limited thereto.

The current mirror circuit 122 includes a current source I21 and two bipolar junction transistors (BJTs) Q21 and Q22. The current source I21 generates a first reference current 10 uA using a reference voltage VR2. It is an example that the first reference current is set to 10 uA, and an exemplary embodiment is not limited thereto.

A base and a collector of the BJT Q21 are connected to each other, and an emitter of the BJT Q21 is connected to the ground. The first reference current is supplied to the base and the collector of the BJT Q21. A base of the BJT 22 is connected to the base of the BJT Q21, a collector of the BJT 22 is connected to the upper end pin UP2, and an emitter of the BJT 22 is connected to the ground. The same current as the first reference current flows through the BJT Q22.

The current mirror circuit 123 includes a current source I22 and two BJTs Q23 and Q24. The current source I22 generates a second reference current 1.5 mA using a reference voltage VR2. It is an example that the second reference current is set to 1.5 mA, and an exemplary embodiment is not limited thereto.

A base and a collector of the BJT Q24 are connected to each other, and an emitter of the BJT Q24 is connected to the ground. The second reference current is supplied to the base and the collector of the BJT Q24. A base of the BJT 23 is connected to the base of the BJT Q24, a collector of the BJT 23 is connected to the interception switch 125, and an emitter of the BJT 23 is connected to the ground. The same current as the second reference current flows through the BJT Q23.

The interception switch 125 is connected between the upper end pin UP2 and the current mirror circuit 123. A base of the interception switch 125 is connected to an output terminal of the inverter 124, an emitter of the interception switch 125 is connected to the upper end pin UP2, and a collector of the interception switch 125 is connected to a collector of the BJT Q23.

The inverter 124 inverts the upper end control signal G12 and transfers the inverted signal to the base of the interception switch 125. The interception switch 125 is formed in a pnp type BJT. Therefore, when an output of the inverter 124 is in a low level, the interception switch 125 is turned on, and when an output of the inverter 124 is not a low level, the interception switch 125 is turned off.

A diode D1 is connected between the power supply pin VCC2 and the upper end pin UP2 and intercepts a current flowing from the power supply pin VCC2 to the upper end pin UP2 from occurring. An anode of the diode D1 is connected to the upper end pin UP2, and a cathode of the diode D1 is connected to the power supply pin VCC2.

The lower communication circuit BL2 includes a comparator 126 and a current mirror circuit 127.

The current mirror circuit 127 includes a current controller 128 and two BJTs Q25 and Q26.

A base and a collector of the BJT Q26 are connected to each other, and an emitter of the BJT Q26 is connected to a voltage VB2. A base of the BJT Q25 is connected to the base of the BJT Q26, the collector of the BJT 26 is connected to the lower end pin LP2, and the emitter of the BJT 26 is connected to a voltage VB.

The current controller 128 includes two current sources 123 and 124 that are connected to the collector of the BJT Q26 and two transistors M21 and M22. The current source I23 generates a third reference current 1 mA using the voltage VB2, and the current source I24 generates a fourth reference current 20 uA using the voltage VB2. It is an example that the third reference current and the fourth reference current are set to 1 mA and 20 uA, respectively, and an exemplary embodiment is not limited thereto.

The transistor M21 is connected between the current source I23 and the ground, and the transistor M22 is connected between the current source I24 and the ground. A drain electrode of the transistor M21 is connected to the current source I23, the lower end control signal G21 is applied to a gate electrode of the transistor M21, and a source electrode of the transistor M21 is connected to the ground.

A drain electrode of the transistor M22 is connected to the current source I24, the sensing signal SS2 is applied to a gate electrode of the transistor M22, and a source electrode of the transistor M22 is connected to the ground.

A current flowing through the BJT Q26 is determined according to a switching operation of the transistor M21 and the transistor M22. A current flowing to the BJT Q26 is copied according to a predetermined copy ratio and flows to the BJT Q25. A copy ratio of the current mirror circuit 127 is set to one-to-one. A copy ratio according to an exemplary embodiment is not limited thereto.

The comparator 126 generates lower state signal L2 based on a comparison result of a voltage according to state information that is transferred through the lower end pin LP2 and a threshold voltage VT2. A voltage according to state information that is transferred through the lower end pin LP2 is a non-inversion terminal (+) voltage of the comparator 126 and is referred to as a lower end voltage LPV2.

The threshold voltage VT2 is input to an inversion terminal (−) of the comparator 126. When an input of a non-inversion terminal (+) of the comparator 126 is equal to or larger than that of an inversion terminal (−), an output of the comparator 126 is in a high level, and when an input of a non-inversion terminal (+) of the comparator 126 is less than that of an inversion terminal (−), an output of the comparator 126 is in a low level. The output of the comparator 126 is a lower state signal L2. For example, when state information of the battery management circuit 100_3 is abnormal, the lower state signal L2 is in a low level or when state information of the battery management circuit 100_4 is abnormal, if an abnormal state of the battery management circuit 100_4 is transferred from the battery management circuit 100_3, the lower state signal L2 is in a low level.

The controller 110_2 generates an upper end control signal G12, a lower end control signal G22, and a sensing signal SS2 according to an upper state signal U2, a lower state signal L2, and a state of the corresponding battery cells CELL6-CELL10.

In an exemplary embodiment, an abnormal state comprises at least three as follows.

A first abnormal state indicates a case where an abnormal state has occurred in at least one of upper end battery management circuits based on a corresponding battery management circuit.

A second abnormal state indicates a case where an abnormal state has occurred in at least one of lower end battery management circuits based on a corresponding battery management circuit.

A third abnormal state indicates when a corresponding battery management circuit is in an abnormal state. That is, a third abnormal state indicates when at least one of a plurality of battery cells that are connected to a corresponding battery management circuit is abnormal.

For example, when the second and third abnormal states are sensed, the controller 110_2 generates a high level of upper end control signal G12 and generates a low level of upper end control signal G12 in other conditions.

Only when the controller 110_2 is in a normal state, the controller 110_2 generates a high level of lower end control signal G22, and when one of the first to third abnormal states is sensed, the controller 110_2 generates a low level of lower end control signal G22.

When the second abnormal state is sensed, the controller 110_2 generates a high level of sensing signal SS2.

When comparing each of the battery management circuits 100_1, 100_3, and 100_4 with the battery management circuit 100_2, only a connected plurality of battery cells and adjacent battery management circuit are different and a configuration and operation thereof are the same as those of the battery management circuit 100_2. Therefore, a description of a configuration of each of the battery management circuits 100_1, 100_3, and 100_4 will be omitted.

Hereinafter, a bidirectional interface method between battery management circuits according to an exemplary embodiment will be described with reference to FIGS. 3 and 4.

Figure 3:
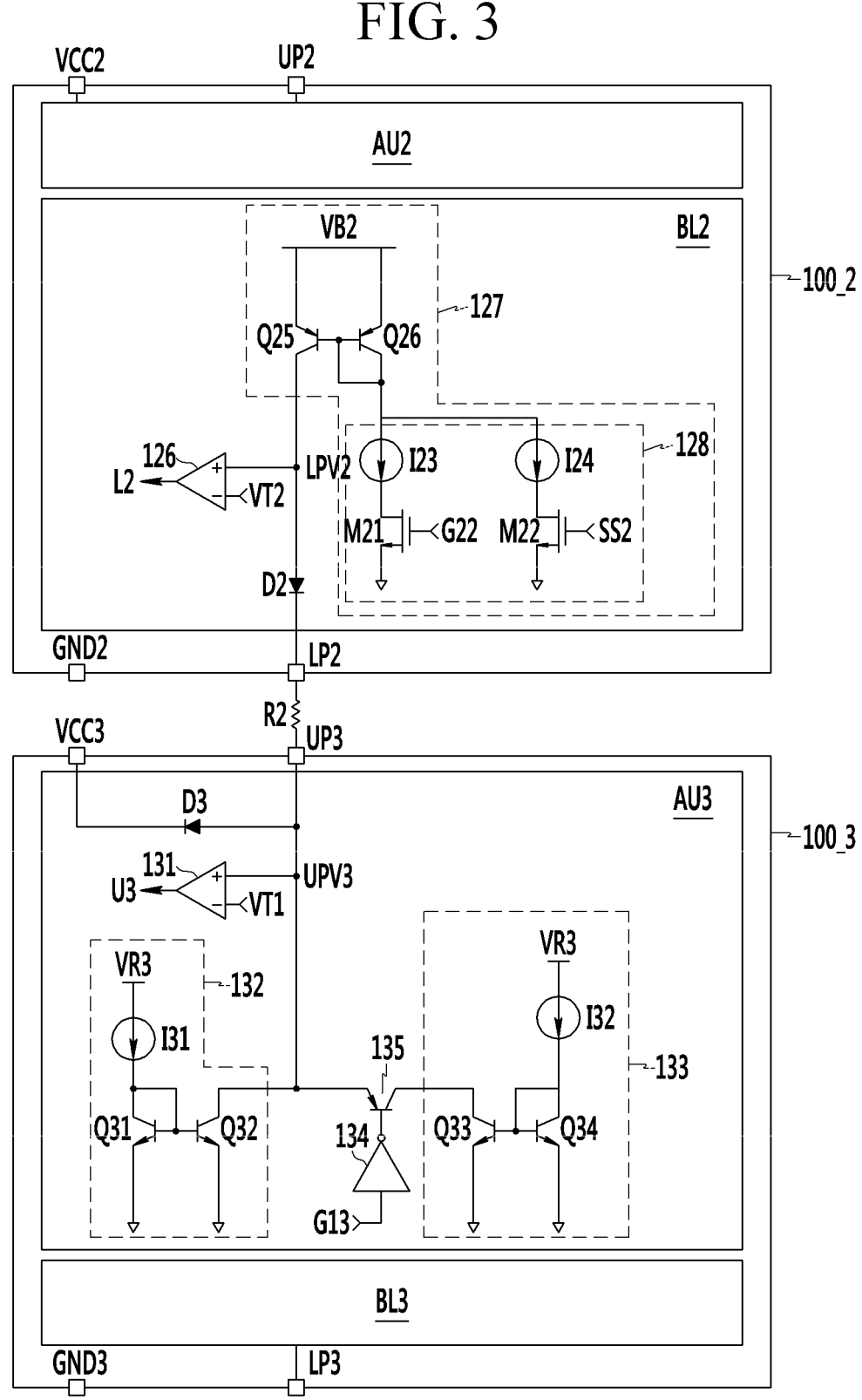
FIG. 3 is a diagram illustrating a bidirectional interface of two adjacent battery management circuits.

FIG. 3 is a diagram illustrating a bidirectional interface of two adjacent battery management circuits.

1) For example, referring to FIG. 3, in a normal state, a bidirectional interface method between the lower communication circuit BL2 of the battery management circuit 100_2 and the upper communication circuit AU3 of the battery management circuit 100_3 will be described.

As shown in FIG. 3, the upper communication circuit AU3 of the battery management circuit 100_3 is connected through the lower communication circuit BL2 and the resistor R2 of the battery management circuit 100_2 of FIG. 2.

Because the battery management circuit 100_2 is in a normal state, the lower end control signal G22 is in a high level and the sensing signal SS2 is in a low level. Therefore, the transistor M21 is in a turn-on state, and the transistor M22 is in a turned-off state.

The third reference current 1 mA flows through the BJT Q26 through the transistor M21 in a turn-on state, and the copied current 1 mA flows to the BJT Q25.

Because the battery management circuit 100_3 is also in a normal state, the upper end control signal G13 is in a low level, and an output of an inverter 134 is in a high level. Therefore, an interception switch 135 is in a turn-off state. In this case, 10 uA, which is the first reference current flows through a BJT Q32 of a current mirror circuit 132.

The lower end voltage LPV2 generating when a current of 1 mA flows to the resistor R2 is larger than the threshold voltage VT2, and the lower end voltage LPV2 is transferred to the upper end pin UP3 through the resistor R2. The BJT Q32 is biased by an upper end voltage UPV3, and 10 uA, which is the first reference current flows through the BJT Q32. In this case, the upper end voltage UPV3 is larger than the threshold voltage VT1.

Therefore, the lower state signal L2 of the battery management circuit 100_2 is in a high level, and an upper state signal U3 of the battery management circuit 100_3 is in a high level. In this way, state information of the battery management circuit 100_2 is transmitted to the battery management circuit 100_3 that is positioned at a lower end portion, and state information of the battery management circuit 100_3 is transmitted to the battery management circuit 100_2 that is portioned at an upper end portion.

2) When state information of the battery management circuit 100_2 is changed to an abnormal state, a bidirectional interface method between the lower communication circuit BL2 of the battery management circuit 100_2 and the upper communication circuit AU3 of the battery management circuit 100_3 will be described.

When state information of the battery management circuit 100_1 is changed to an abnormal state, the state information is transferred to the upper communication circuit AU2 of the battery management circuit 100_2. Therefore, state information of the battery management circuit 100_2 is changed by a first abnormal state.

Specifically, in the plurality of battery cells CELL1-CELL5 that are connected to the battery management circuit 100_1, an overvoltage or a low voltage occurs, and the controller 110_1 generates an upper end control signal G11 of a high level and a lower end control signal G12 of a low level.

Therefore, as the first reference current of the lower communication circuit BL1 is intercepted, a lower end voltage of the battery management circuit 100_1 becomes a low level and the lower state signal L1 becomes a low level. Because a lower end voltage of the battery management circuit 100_1 that is supplied through the upper end pin UP2 of the battery management circuit 1002 is a low level, the upper end voltage UPV2 becomes also a low level. In this case, the upper end voltage UPV2 is smaller than the threshold voltage VT1, and the BJT Q22 of the current mirror circuit 122 is not biased, and thus the first reference current does not flow.

The upper state signal U2 becomes a low level, the controller 110_2 senses a first abnormal state, generates an upper end control signal G12 of a low level and a lower end control signal G22 of a low level, and maintains the sensing signal SS2 of a low level.

Referring to FIG. 3, in the lower communication circuit BL2, as the transistor M21 is turned off by the lower end control signal 22 of a low level, a third reference current 1 mA is intercepted, and thus a current that is supplied to the resistor R2 is intercepted. Therefore, the lower end voltage LPV2 becomes a low level voltage lower than the threshold voltage VT2, and thus the lower state signal L2 becomes a low level.

Because the lower end voltage LVP2 that is supplied through the upper end pin UP3 of the battery management circuit 100_3 is a low level, the upper end voltage UPV3 become also a low level. In this case, the upper end voltage UPV3 is smaller than the threshold voltage VT1, and the BJT Q32 of the current mirror circuit 132 is not biased and thus the first reference current does not flow.

A comparator 131 changes the upper state signal U3 to a low level, and the controller 110_3 senses a first abnormal state. The controller 110_3 generate an upper end control signal G13 of a low level and a lower end control signal G23 of a low level and maintains a sensing signal SS3 of a low level. Therefore, the lower state signal L3 becomes also a low level.

Such an operation is performed between the lower communication circuit BL3 of the battery management circuit 100_3 and the upper communication circuit AU4 of the battery management circuit 100_4. Therefore, the upper state signal U4 of the battery management circuit 100_4 becomes a low level, and the controller 110_4 senses a first abnormal state, generates an upper end control signal of a low level and a lower end control signal of a low level, and maintains a sensing signal of a low level.

As described above, the lower communication circuit BL4 of the battery management circuit 100_4 generates a lower state signal L4 of a low level according to a lower end control signal of a low level and a sensing signal of a low level.

When one of the upper state signal U4 and the lower state signal L4 is in a low level, the battery management circuit 100_4 generates a protection control signal PCS that turns off the protection control switch 200.

In the case 2), as state information of the battery management circuit 100_1 is changed to an abnormal state, a case where state information of the battery management circuit 100_2 is changed to an abnormal state has been exemplified.

3) As another example, when at least one of battery cells (e.g., CELL6-CELL10) is in an abnormal state (third abnormal state), in order to notify adjacent battery management circuits (e.g., 100_1, 100_3) of an abnormal state, the battery management circuit (e.g., 100_2) uses a bidirectional interface.

Hereinafter, a bidirectional interface method will be described with reference to FIG. 4.

Figure 4:
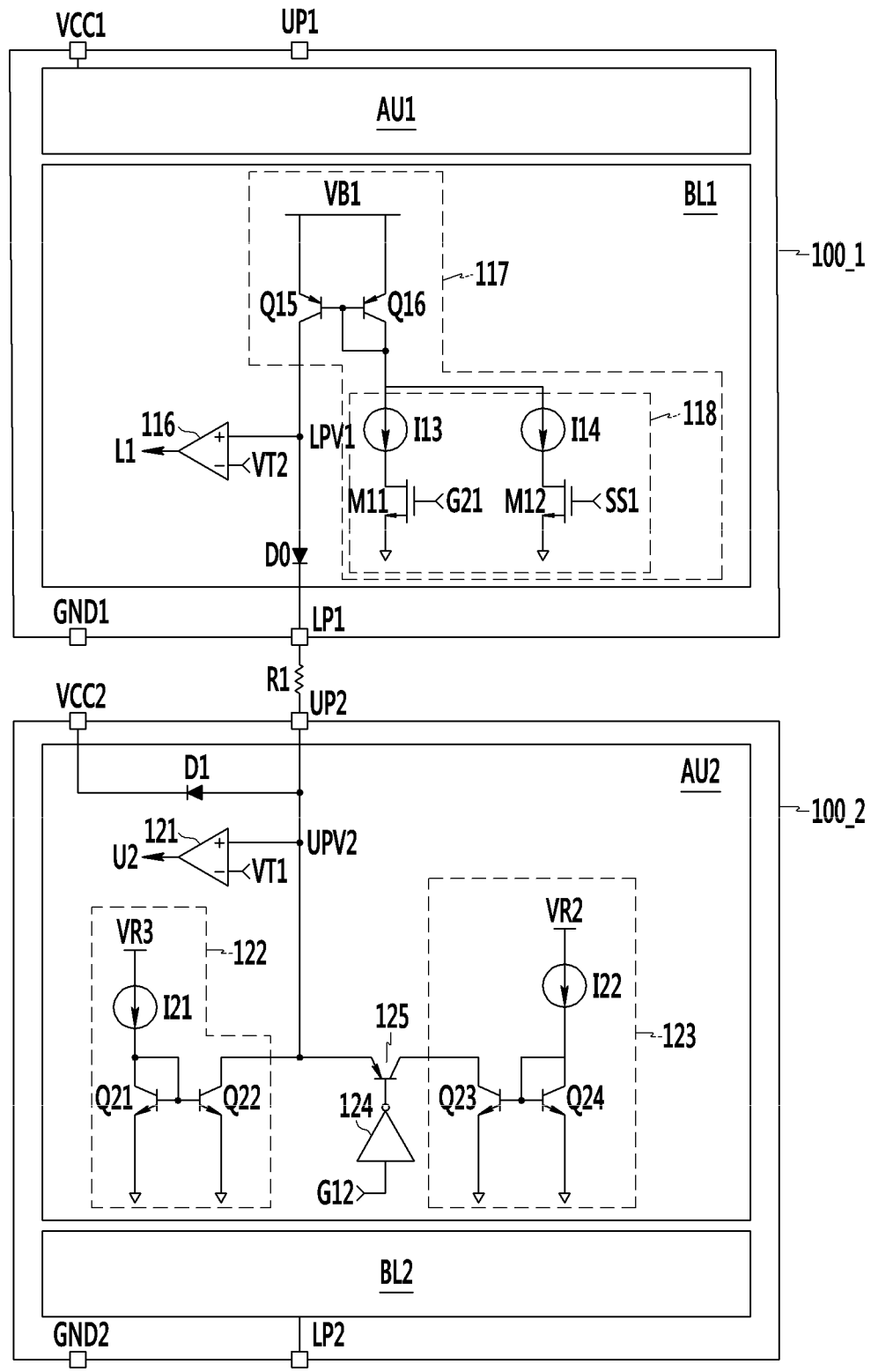
FIG. 4 is a diagram illustrating a bidirectional interface of two adjacent battery management circuits.

FIG. 4 is a diagram illustrating a bidirectional interface of two adjacent battery management circuits.

When the controller 110_2 senses a third abnormal state, the controller 110_2 generates an upper end control signal G12 of a high level and a lower end control signal G22 of a low level and maintains a sensing signal SS2 of a low level.

The upper end control signal G12 of a high level is inverted through an inverter 124, and the interception switch 125 is turned on by the inverted upper end control signal G12. Therefore, the second reference current 1.5 mA of the current source I22 is copied to flow to the BJT Q23.

A current flowing to the upper end pin UP2 of the battery management circuit 100_2 through the lower end pin LP1 of the battery management circuit 100_1 is a current 1 mA in which the third reference current 1 mA is copied. That is, a sink current from the upper end pin UP2 of the battery management circuit 100_2 is larger than a supplied current 1 mA. Therefore, the upper end voltage UPV2 becomes a low level and becomes a voltage lower than the threshold voltage VT1, and the comparator 121 outputs an upper state signal U2 of a low level.

A voltage, i.e., a lower end voltage LPV1 of the lower end pin LP1 that is connected through the upper end voltage UPV2 and the resistor R1 becomes a lower level to be a voltage lower than the threshold voltage VT2. Therefore, a comparator 116 generates a lower state signal L2 of a low level.

The controller 110_1 generates an upper end control signal G11 of a high level, a lower end control signal G21 of a low level, and a sensing signal SS1 of a high level according to the lower state signal U2 of a low level. A transistor M11 is turned off according to the lower end control signal G21 of a low level, and the transistor M12 is turned on according to the sensing signal SS1 of a high level.

In this way, state information of the battery management circuit 100_2 is transferred in a direction (upper direction) advancing toward the battery management circuit 100_1. That is, when battery management circuits that are positioned at an upper direction of the battery management circuit 1002 are in plural (e.g., the number larger than that of battery management circuits that are shown in FIG. 1), state information of the battery management circuit 100_2 is transferred in an upper direction by the same method as a bidirectional interface method between the battery management circuit 100_1 and the battery management circuit 1002.

Therefore, an upper end control signal of entire battery management circuits that are positioned at an upper end portion of the battery management circuit 100_2 becomes a high level, a lower end control signal thereof becomes a low level, and a sensing signal thereof becomes a high level.

In the case 2), when state information of the battery management circuit 100_2 is changed to an abnormal state, a bidirectional interface method between the battery management circuit 100_3 and the battery management circuit 100_2 has been described. Therefore, a description of a bidirectional interface method between the battery management circuit 1002 and the battery management circuit 100-3 generating in this case 3) will be omitted.

In addition, when battery management circuits that are positioned in a lower direction of the battery management circuit 100_2 are in plural (e.g., the number larger than that of battery management circuits that are shown in FIG. 1), state information of the battery management circuit 100_2 is transferred by the same method as a bidirectional interface method between the battery management circuit 100_2 and the battery management circuit 100_3.

Therefore, an upper end control signal and a sensing signal of entire battery management circuits that are positioned at a lower end portion of the battery management circuit 100_2 are maintained to a low level, and a lower end control signal is reduced to a low level.

In the foregoing description, a method in which state information of a battery management circuit that is changed from a normal state to an abnormal state is transmitted in an upper direction and a low direction has been described.

Hereinafter, a bidirectional interface method when state information of a battery management circuit is changed from an abnormal state to a normal state will be described.

4) Entire voltages of the plurality of battery cells CELL6-CELL10 that have been in an abnormal state in the case 3) become a normal state and thus a bidirectional interface method when state information of the battery management circuit 100_2 is restored to a normal state will be described.

In the case 3), because the lower state signal L1 of a low level has first occurred, the controller 110_1 senses a second abnormal state and generates a sensing signal SS1 from a time point at which the lower state signal L1 of a low level has occurred. The controller 110_1 generates a sensing signal SS1 of a high level until sensing that state information of the battery management circuit 100_2 is restored to a normal state.

As entire voltages of the plurality of battery cells CELL6-CELL10 become a normal state, it is assumed that state information of the battery management circuit 100_2 is restored to a normal state. Therefore, as the upper end control signal G12 becomes a low level, the interception switch 125 is turned off, and a sink current from the upper end pin UP2 is a current 10 uA in which the first reference current 10 uA is copied. When a current 20 uA in which the fourth reference current 20 uA is copied through the lower end pin LP1 of the battery management circuit 100_1 is supplied (the sensing signal SS1 is in a high level), the upper end voltage UPV2 becomes a high level and becomes a voltage larger than the threshold voltage VT1. Therefore, an upper state signal U2 becomes a high level.

The lower end voltage LPV1 generating when a current 20 uA flows to the resistor R1 becomes a high level and becomes a voltage larger than the threshold voltage VT2. Therefore, the lower state signal L1 becomes a high level. As the lower state signal L1 increases, the controller 110_1 generates an upper end control signal G11 in a low level and the lower end control signal G21 in a high level. Therefore, as the transistor M11 is turned on, the third reference current 1 mA is copied to flow to the resistor R1, and the lower end voltage LPV1 further increases. Further, the controller 110_1 changes the sensing signal SS1 to a low level at a time point at which the lower state signal L1 increases to a high level.

In addition, when battery management circuits that are positioned at an upper direction of the battery management circuit 100_2 are in plural (e.g., the number larger than that of battery management circuits that are shown in FIG. 1), state information (change from an abnormal state to a normal state) of the battery management circuit 100_1 is transferred by a bidirectional interface method between the battery management circuit 100_1 and the battery management circuit 1002.

Therefore, entire battery management circuits that are positioned at an upper end portion of the battery management circuit 100_2 generate an upper end control signal in a low level, a lower end control signal in a high level, and a sensing signal in a low level according to increase of a lower state signal.

Hereinafter, a bidirectional interface method will be described again with reference to FIG. 3.

When state information of the battery management circuit 100_2 is restored to a normal state, the controller 110_2 increases the lower end control signal G22 to a high level. Therefore, the transistor M21 is turned on, and thus a current 1 mA in which the third reference current 1 mA is copied flows to the resistor R2 through the lower end pin LP2.

The lower end voltage LPV2 generating when a current of 1 mA flows to the resistor R2 is larger than the threshold voltage VT2, and the lower end voltage LPV2 is transferred to the upper end pin UP3 through the resistor R2. The BJT Q32 is biased by the upper end voltage UPV3, and 10 uA, which is a first reference current flows through the BJT Q32. In this case, the upper end voltage UPV3 is larger than the threshold voltage VT1.

Therefore, the lower state signal L2 of the battery management circuit 100_2 becomes a high level, and the upper state signal U3 of the battery management circuit 100_3 becomes a high level.

As described above, when the second and third abnormal states are sensed, a corresponding controller generates an upper end control signal of a high level. That is, in the case 3), because the controller 110_3 of the battery management circuit 100_3 sensed a first abnormal state, the upper end control signal G13 maintains a low level. In the case 4), the reason why the BJT Q32 may be biased is that 1 mA is supplied from the battery management circuit 100_2 when the interception switch 135 is maintained to a turn-off state.

The controller 110_3 increases the lower end control signal G23 to a high level according to increase of an upper state signal U3. Thereafter, the lower state signal L3 is increased to a high level.

Similar to a bidirectional interface method between the battery management circuit 100_2 and the battery management circuit 100_3, a bidirectional interface is performed between the battery management circuit 100_3 and the battery management circuit 100_4.

Therefore, the upper state signal U4 of the battery management circuit 100_4 is increased to a high level, and the lower state signal L4 is also increased to a high level. Therefore, as the protection control signal PCS is also increased to a high level, the protection control switch 200 is turned on.

In addition, when battery management circuits that are positioned at a lower direction of the battery management circuit 100_2 are in plural (e.g., the number larger than that of battery management circuits that are shown in FIG. 1), state information (change from an abnormal state to a normal state) of the battery management circuit 100_2 is transferred by a bidirectional interface method between the battery management circuit 100_2 and the battery management circuit 100_3.

Therefore, entire battery management circuits that are positioned at a lower end portion of the battery management circuit 100_2 change a lower end control signal to a high level according to increase of an upper state signal. In this case, an upper end control signal and a sensing signal are maintained to a low level.

In the foregoing description, a bidirectional interface method according to an exemplary embodiment has been described. Conventionally, when the number of pins necessary for transmitting state information in one direction of both directions is two, i.e., when total 4 pins exist, a bidirectional interface is available, but in an exemplary embodiment, a bidirectional interface is available with only 2 pins.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS battery management circuits 100_1-100_4, battery pack 500
resistors R1-R3, controllers 110_1-110_4
upper communication circuits AU1-AU4,
lower communication circuits BL1-BL4
battery cells CELL1-CELL20, protection control switch 200
battery pack charger 300, battery pack load 400
comparators 121, 126, 116, and 131
current mirror circuits 122, 123, 127, 117, 132, and 133
inverters 124 and 134, interception switches 125 and 135
current sources I21-I24, I31, and I32
BJTs Q15, Q16, Q21-Q26, and Q31-Q34
transistors M21, M22, M11, and M12
diodes D0-D3

What is claimed is:

1. A bidirectional interface circuit, comprising:
a first current mirror circuit configured to copy a first reference current to generate a first current that is sunk from a first output terminal;
a second current mirror circuit configured to copy a second reference current to generate a second current that is sunk from a second output terminal;
an interception switch connected between the first output terminal and the second output terminal;
a first comparator configured to output an upper state signal based on a comparison result of a voltage of the first output terminal and a first threshold voltage;
a third current mirror circuit configured to copy one of a third reference current and a fourth reference current to supply a third current flowing to a third output terminal; and
a second comparator configured to output a lower state signal based on a comparison result of a voltage of the third output terminal and a second threshold voltage.

2. The bidirectional interface circuit of claim 1, wherein the first current mirror circuit comprises:
a first current source configured to supply the first reference current;
a first BJT having a first end connected to ground and a second end and a control terminal connected to the first current source; and
a second BJT having a first end connected to ground, a control terminal connected to the control terminal of the first BJT, and a second end connected to the first output terminal.

3. The bidirectional interface circuit of claim 1, wherein the second current mirror circuit comprises:
a second current source configured to supply the second reference current;
a third BJT having a first end connected to ground and a second end and a control terminal connected to the second current source; and
a fourth BJT having a first end connected to ground, a control terminal connected to the control terminal of the third BJT, and a second end connected to the second output terminal.

4. The bidirectional interface circuit of claim 1, wherein the third current mirror circuit comprises:
a fifth BJT having a first end, a second end to which a first voltage is supplied, and a control terminal connected to the second end;
a sixth BJT having a first end to which the first voltage is supplied, a second end connected to the third output terminal and a control terminal connected to the control terminal of the first BJT;
a first transistor and a first current source configured to supply a third reference current connected in series between ground and the second end of the fifth BJT; and
a second transistor and a second current source configured to supply a fourth reference current connected in series between ground and the second end of the fifth BJT.

5. A battery management system, comprising:
a first battery management circuit connected to a plurality of first battery cells;
a second battery management circuit connected to a plurality of second battery cells adjacent to the plurality of first battery cells; and
a first resistor connected between a first upper end pin of the first battery management circuit and a second lower end pin of the second current mirror circuit,
wherein the first battery management circuit includes
a first current mirror circuit configured to copy a first reference current to sink a first current from the first upper end pin; a second current mirror circuit configured to copy a second reference current to sink a second current from the first upper end pin;
a first interception switch connected between the first upper end pin and the second current mirror circuit; and
a first comparator configured to output a comparison result of a first upper end voltage of the first upper end pin and a first threshold voltage, and
wherein the second battery management circuit includes
a third current mirror circuit configured to copy one of a third reference current and a fourth reference current to supply a third current to the second lower end pin; and
a second comparator configured to output a comparison result of a second threshold voltage and a second lower voltage of the second lower end pin generated by the third current and the resistor.

6. The battery management system of claim 5, wherein the first current mirror circuit comprises:
a first current source configured to supply the first reference current;
a first BJT having a first end connected to ground and a second end and a control terminal connected to the first current source; and
a second BJT having a first end connected to ground, a control terminal connected to the control terminal of the first BJT and a second end connected to the first upper end pin.

7. The battery management system of claim 5, wherein the second current mirror circuit comprises:
a second current source configured to supply the second reference current;
a third BJT having a first end connected to ground and a second end and a control terminal connected to the second current source; and
a fourth BJT having a first end connected to ground, a control terminal connected to the control terminal of the third BJT and a second end connected to a first end of the first interception switch,
wherein the second end of the first interception switch is connected to the first upper end pin.

8. The battery management system of claim 5, wherein the third current mirror circuit comprises:
a fifth BJT having a first end, a second end to which a first voltage is supplied and a control terminal connected to the second end;
a sixth BJT having a first end to which a first voltage is supplied, a second end connected to the second lower end pin and a control terminal connected to the control terminal of the first BJT;
a first transistor and a first current source configured to supply a third reference current connected in series between ground and the second end of the fifth BJT; and
a second transistor and a second current source configured to supply a fourth reference current connected in series between ground and the second end of the fifth BJT.

9. The battery management system of claim 8, wherein the second lower end voltage decreases lower than the second threshold voltage, and the first upper end voltage becomes lower than the first threshold voltage due to a decrease of the second lower end voltage, when the first transistor is changed from a turn-on state to a turn-off state.

10. The battery management system of claim 9, wherein the first upper end voltage increases to the second threshold voltage or more due to the third reference current and the resistor, and the second lower end voltage becomes the first threshold voltage or more due to an increase of the first upper end voltage, when the first transistor is changed from a turn-off state to a turn-on state.

11. The battery management system of claim 8, wherein the first upper end voltage decreases lower than the first threshold voltage, and the second lower end voltage decreases lower than the second threshold voltage due to a decrease of the first upper end voltage, when the first interception switch is turned on.

12. The battery management system of claim 11, wherein the first transistor is turned off, and the second transistor is turned on, when the second lower end voltage is lower than the second threshold voltage.

13. The battery management system of claim 12, wherein when the second transistor is in a turn-on state, if the first interception switch is turned off, the first upper end voltage increases to the first threshold voltage or more, and the second lower end voltage becomes the second threshold voltage or more due to an increase of the first upper end voltage.

14. The battery management system of claim 13, wherein the first transistor is turned on, and the second transistor is turned off, when the first upper end voltage becomes the second threshold voltage or greater.

15. The battery management system of claim 5, further comprising:
a third battery management circuit connected to a plurality of third battery cells adjacent to the plurality of first battery cells; and
a second resistor connected between a first lower end pin of the first battery management circuit and a third upper end pin of the third battery management circuit,
wherein the third battery management circuit includes
a fourth current mirror circuit configured to copy a first reference current to sink a fourth current from the third upper end pin;
a fifth current mirror circuit configured to copy the second reference current to sink a fifth current from the third upper end pin;
a second interception switch connected between the third upper end pin and the second current mirror circuit; and
a third comparator configured to output a comparison result of a third upper end voltage of the third upper end pin and a first threshold voltage.

16. The battery management system of claim 15, wherein the first battery management circuit comprises:
a seventh BJT having a first end, a second end to which a second voltage is supplied, and a control terminal connected to the second end;
an eighth BJT having a first end to which a second voltage is supplied, a second end connected to the first lower end pin and a control terminal connected to the control terminal of the seventh BJT;
a third transistor and a third current source configured to supply the third reference current connected in series between ground and the second end of the seventh BJT; and
a fourth transistor and a fourth current source configured to supply the fourth reference current connected in series between ground and the second end of the seventh BJT.

17. The battery management system of claim 16, wherein the second lower end voltage decreases lower than the second threshold voltage, the first upper end voltage decreases lower than the first threshold voltage due to a decrease of the second lower end voltage, and the third transistor is turned off, when the first transistor is changed from a turn-on state to a turn-off state.

18. The battery management system of claim 17, wherein the first upper end voltage increases to the second threshold voltage or more due to the third reference current and the resistor, the second lower end voltage becomes the first threshold voltage or more due to an increase of the first upper end voltage, and the third transistor is turned on, when the first transistor is changed from a turn-off state to a turn-on state.

19. The battery management system of claim 16, wherein when the second interception switch is turned on,
the third upper end voltage decreases lower than the first threshold voltage, and the first lower end voltage decreases lower than the second threshold voltage due to a decrease of the third upper end voltage, and
the first interception switch is turned on, the third transistor is turned off, and the fourth transistor is turned on.

20. The battery management system of claim 19, wherein when the second transistor is in a turn-on state, if the second interception switch is turned off,
the third upper end voltage increases to the first threshold voltage or more, and the first lower end voltage becomes the second threshold voltage or more due to an increase of the third upper end voltage, and
the third transistor is turned on, and the fourth transistor is turned off.

* * * * *